US012211289B2

(12) United States Patent
Koravadi

(10) Patent No.: US 12,211,289 B2
(45) Date of Patent: Jan. 28, 2025

(54) VEHICULAR PARKING SYSTEM

(71) Applicant: MAGNA ELECTRONICS INC., Auburn Hills, MI (US)

(72) Inventor: Krishna Koravadi, Rochester Hills, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

(21) Appl. No.: 18/065,746

(22) Filed: Dec. 14, 2022

(65) Prior Publication Data

US 2023/0113427 A1    Apr. 13, 2023

Related U.S. Application Data

(63) Continuation of application No. 16/356,003, filed on Mar. 18, 2019, now abandoned, which is a continuation of application No. 15/878,727, filed on Jan. 24, 2018, now Pat. No. 10,235,581, which is a continuation of application No. 14/519,469, filed on Oct. 21, 2014, now Pat. No. 9,881,220.

(60) Provisional application No. 62/001,795, filed on May 22, 2014, provisional application No. 61/947,053, filed on Mar. 3, 2014, provisional application No. 61/895,610, filed on Oct. 25, 2013.

(51) Int. Cl.
G06V 20/58    (2022.01)

(52) U.S. Cl.
CPC .................. *G06V 20/584* (2022.01)

(58) Field of Classification Search
None
See application file for complete search history.

(56) References Cited

U.S. PATENT DOCUMENTS

| | | | |
|---|---|---|---|
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,302,545 B1 | 10/2001 | Schofield et al. |
| 6,396,397 B1 | 5/2002 | Bos et al. |
| 6,405,132 B1 | 6/2002 | Breed et al. |
| 6,498,620 B2 | 12/2002 | Schofield et al. |

(Continued)

*Primary Examiner* — Tyler W. Sullivan
(74) *Attorney, Agent, or Firm* — HONIGMAN LLP

(57) ABSTRACT

A vehicular parking system includes vehicle-to-vehicle (V2V) communication system disposed at a first vehicle. The vehicular parking system, as the first vehicle navigates a parking facility in search of an available parking space, receives a parking space availability communication via the V2V communication system. The parking space availability communication originates from a second vehicle that is also navigating the parking facility. The parking space availability communication indicates multiple available parking spaces within the parking facility and the multiple available parking spaces are determined by the second vehicle as the second vehicle navigates the parking facility and passes available parking spaces. The vehicular parking system, responsive to receiving the parking space availability communication, reserves one of the multiple available parking spaces of the parking space availability communication for the first vehicle.

17 Claims, 10 Drawing Sheets

(56) References Cited

U.S. PATENT DOCUMENTS

| | | |
|---|---|---|
| 6,523,964 B2 | 2/2003 | Schofield et al. |
| 6,611,202 B2 | 8/2003 | Schofield et al. |
| 6,636,258 B2 | 10/2003 | Strumolo |
| 6,690,268 B2 | 2/2004 | Schofield et al. |
| 6,693,517 B2 | 2/2004 | McCarthy et al. |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,946,978 B2 | 9/2005 | Schofield |
| 6,975,246 B1 | 12/2005 | Trudeau |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,474,232 B2 * | 1/2009 | Chen ................. G08G 1/14 705/13 |
| 7,492,283 B1 * | 2/2009 | Racunas, Jr. ...... G06Q 30/0284 705/13 |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 9,581,997 B1 * | 2/2017 | Penilla .................. B60L 53/65 |
| 9,881,220 B2 | 1/2018 | Koravadi |
| 10,179,545 B2 | 1/2019 | Taylor et al. |
| 10,235,581 B2 | 3/2019 | Koravadi |
| 11,100,798 B2 * | 8/2021 | Chinomi ............ G08G 1/205 |
| 2003/0095039 A1 | 5/2003 | Shimomura et al. |
| 2004/0225434 A1 | 11/2004 | Gotfried |
| 2006/0254142 A1 | 11/2006 | Das et al. |
| 2007/0222638 A1 | 9/2007 | Chen et al. |
| 2010/0085171 A1 | 4/2010 | Do |
| 2010/0100268 A1 | 4/2010 | Zhang et al. |
| 2011/0032119 A1 | 2/2011 | Pfeiffer et al. |
| 2012/0044091 A1 | 2/2012 | Kim et al. |
| 2012/0062743 A1 | 3/2012 | Lynam et al. |
| 2012/0095646 A1 | 4/2012 | Ghazarian |
| 2012/0200430 A1 * | 8/2012 | Spahl .................. G08G 1/143 340/932.2 |
| 2012/0218412 A1 | 8/2012 | Dellantoni et al. |
| 2012/0249589 A1 | 10/2012 | Gassner et al. |
| 2012/0274481 A1 | 11/2012 | Ginsberg et al. |
| 2012/0283908 A1 | 11/2012 | Schofield et al. |
| 2013/0010103 A1 | 1/2013 | Ihara et al. |
| 2013/0116859 A1 | 5/2013 | Ihlenburg et al. |
| 2013/0222592 A1 | 8/2013 | Gieseke |
| 2013/0293394 A1 | 11/2013 | Rubin et al. |
| 2013/0342333 A1 | 12/2013 | Hutchings |
| 2014/0121883 A1 | 5/2014 | Shen et al. |
| 2014/0211012 A1 * | 7/2014 | Nerayoff ............ G06F 18/22 348/148 |
| 2014/0218529 A1 | 8/2014 | Mahmoud et al. |
| 2014/0266802 A1 | 9/2014 | Love |
| 2014/0320317 A1 | 10/2014 | Grauer et al. |
| 2014/0375476 A1 | 12/2014 | Johnson et al. |
| 2014/0379233 A1 | 12/2014 | Chundrlik, Jr. et al. |
| 2015/0009048 A1 | 1/2015 | Wang et al. |
| 2015/0124096 A1 | 5/2015 | Koravadi |
| 2015/0154860 A1 | 6/2015 | Holzwanger et al. |
| 2015/0158499 A1 | 6/2015 | Koravadi |
| 2015/0170518 A1 | 6/2015 | Rodriguez Garza |
| 2015/0215779 A1 * | 7/2015 | Fokkelman ......... H04W 12/068 726/7 |
| 2015/0251599 A1 | 9/2015 | Koravadi |
| 2015/0352953 A1 | 12/2015 | Koravadi |
| 2017/0032402 A1 * | 2/2017 | Patsiokas .......... G06Q 30/0207 |
| 2017/0132483 A1 | 5/2017 | Salomonsson et al. |
| 2017/0166115 A1 * | 6/2017 | Pal ..................... B60Q 5/005 |
| 2019/0213428 A1 | 7/2019 | Koravadi |

\* cited by examiner

VEHICULAR PARKING SYSTEM

CROSS REFERENCE TO RELATED APPLICATIONS

The present application is a continuation of U.S. patent application Ser. No. 16/356,003, filed Mar. 18, 2019, which is a continuation of U.S. patent application Ser. No. 15/878,727, filed Jan. 24, 2018, now U.S. Pat. No. 10,235,581, which is a continuation of U.S. patent application Ser. No. 14/519,469, filed Oct. 21, 2014, now U.S. Pat. No. 9,881,220, which claims the filing benefits of U.S. provisional applications, Ser. No. 62/001,795, filed May 22, 2014, Ser. No. 61/947,053, filed Mar. 3, 2014, and Ser. No. 61/895,610, filed Oct. 25, 2013, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides an adaptive traffic light response system that determines the status of a traffic light ahead of the vehicle and, responsive to the determined status and vehicle or driver parameters, generates an alert to the driver (such as when the determined vehicle status or parameters indicate that the driver is not responding properly to the present traffic light signal or condition).

According to an aspect of the present invention, a vision system of a vehicle includes a camera disposed at a vehicle and having a field of view forwardly of the vehicle, and a control comprising an image processor. The image processor is operable to process image data captured by the camera. The control is operable to receive wireless communication (such as from a V2I (vehicle to infrastructure) communication system or the like) that is associated with a traffic light ahead of the vehicle. The wireless communication comprises a communicated status of the traffic light ahead of the vehicle. The image processor, responsive to processing of captured image data, is operable to determine an imaged status of the traffic light ahead of the vehicle and in the field of view of the camera. The control compares the imaged status with the communicated status and, when the communicated status corresponds to the imaged status, determines or confirms the status of the traffic light ahead of the vehicle. Responsive to a determination that the driver of the vehicle is not properly responding to the determined traffic light status, the system is operable to at least one of (i) generate an alert to the driver of the vehicle and (ii) apply the brakes of the vehicle.

According to another aspect of the present invention, a parking assist system for assisting a driver of a vehicle in finding and reserving an available parking slot or space of a parking lot or area includes a communication system operable to communicate information regarding parking slot availability to a receiver of a vehicle. The parking assist system at least one of (i) determines an available parking slot responsive to a received signal indicative of an available parking slot and (ii) determines an available parking slot responsive to image processing of image data captured by at least one camera. Responsive to determination of an available parking slot, the communication system transmits a signal indicative of the available parking slot. Responsive to receipt of the transmitted signal, a driver of the vehicle can reserve the available slot via actuation by the driver of a user input. Responsive to receipt of a reservation signal from the vehicle, the communication system transmits an updated signal to indicate that the parking slot is reserved.

The system may determine an available parking slot responsive to a received signal indicative of an available parking slot, and the received signal may be received from another vehicle at the parking lot. The communication system may determine an available parking slot via image processing of image data captured by at least one camera at the parking lot. The system may comprise a plurality of cameras arranged at the parking lot, wherein the communication system determines available parking slots via image processing of image data captured by the cameras.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
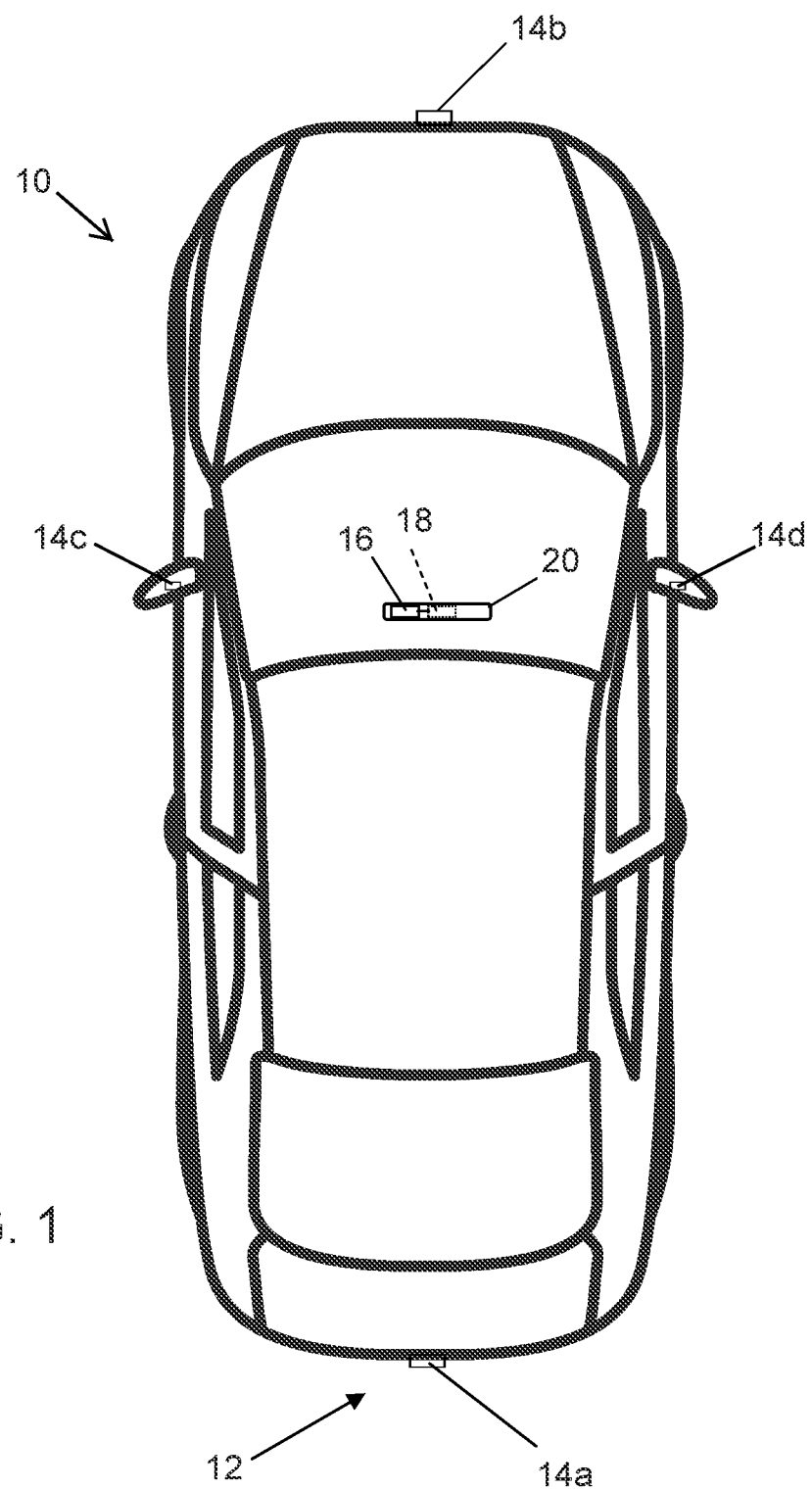
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield and behind the windshield and viewing through the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Many major accidents occur due to driver mistake of not following the traffic lights. The system of the present invention determines, such as via image processing of image data captured by a forward facing or viewing camera of the vehicle, a traffic light status and, responsive to a determination (such as via processing of vehicle status) that the driver is not properly responding to the traffic light or signal, generates an alert to the driver.

Figure 2:
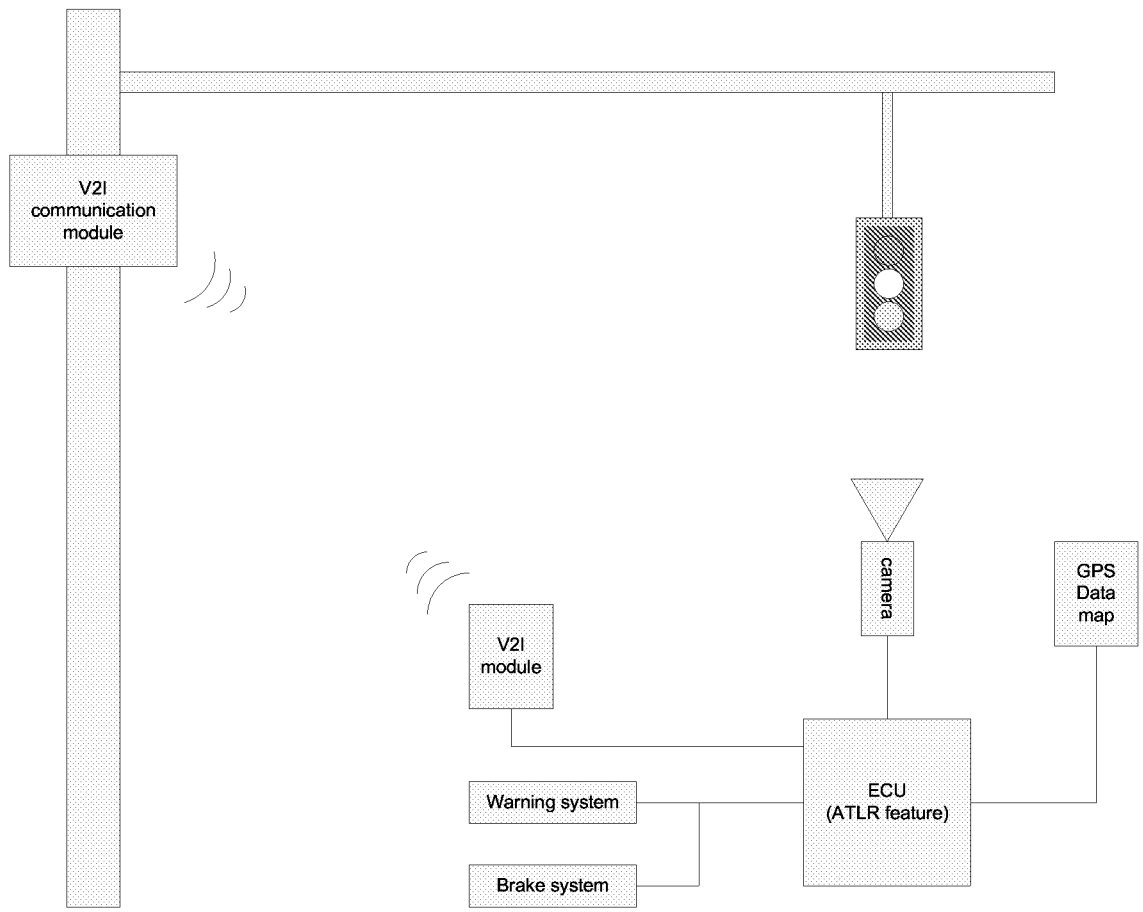
FIG. 2 is a schematic of the traffic light response system of the present invention.

For example, and with reference to FIG. 2, the subject vehicle is equipped with a front imager operable to capture image data and an image processor that processes captured image data (via an image processing algorithm) and determines a traffic light status of a traffic light ahead of the vehicle and in the field of view of the imager. The adaptive traffic light response (ATLR) system (such as an algorithm running in the ECU of the vehicle) monitors the vehicle status (such as brake status, accelerator status, vehicle speed, and/or the like) and the driver response, and is operable to alert the driver if he or she is making a mistake. Optionally, if a determined time to collision (TTC) exceeds a threshold level, the system may apply the vehicle brakes to limit or avoid or mitigate the collision.

Optionally, if the traffic lights are equipped with a V2I (vehicle-to-infrastructure) communication module or the like, the traffic light may broadcast the traffic light status. This information may be received by the V2I communication module of the vehicle and thus, even in poor visibility conditions, the system can receive and process and use the traffic light information. The V2I information may be fused with the camera data to achieve enhanced reliability of the system.

Optionally, when the vehicle is equipped with a GPS system and GPS data maps, the adaptive traffic light response system may use the traffic light location information to fuse with the camera traffic light information to achieve enhanced performance. For example, if the GPS communication does not indicate that there is a traffic light ahead of the vehicle and there is no communication from a V2I communication module ahead of the vehicle, then the control may ignore (or weigh less) a determination of a traffic light condition as determined via image processing of image data captured by the forward facing camera.

The two or three different signals or determinations can be weighted differently depending on the driving conditions and region. For example, on a clear day when the image processor determines that a traffic light is ahead of the vehicle and is a red light, the system may generate an alert to the driver if the driver does not respond accordingly, even if there is no communication from a V2I communication module. Likewise, in poor visibility conditions, the system may respond primarily to the V2I communication module.

Thus, the control of the vision system may be responsive to a communicated traffic light status and a determined or imaged traffic light status, and may determine the traffic light status and generate an alert accordingly. If the two signals indicate the same traffic light status (for example, both indicate that the traffic light is green), then the system determines or confirms the traffic light status and generates an alert and/or applies the vehicle brakes accordingly. When the signals contradict (such as, for example, when the communication or communicated status indicates a green light and the image processor or imaged status indicates a red light), the system may generate an alert to the driver of the vehicle, but may not apply the brakes of the vehicle. This decision may also be dependent on visibility conditions, such that the control applies a greater weight or consideration to the V2I communicated traffic light status in poor visibility conditions or the like (such as fog or rain or snow conditions, such as may be determined via image processing of captured image data). Optionally, the control may generate an alert to the driver responsive to the imaged status being different than the communicated status. Responsive to the determination or confirmation of the traffic light status, the control may generate an alert and/or apply the vehicle brakes or may otherwise control a vehicle function.

Figure 3:
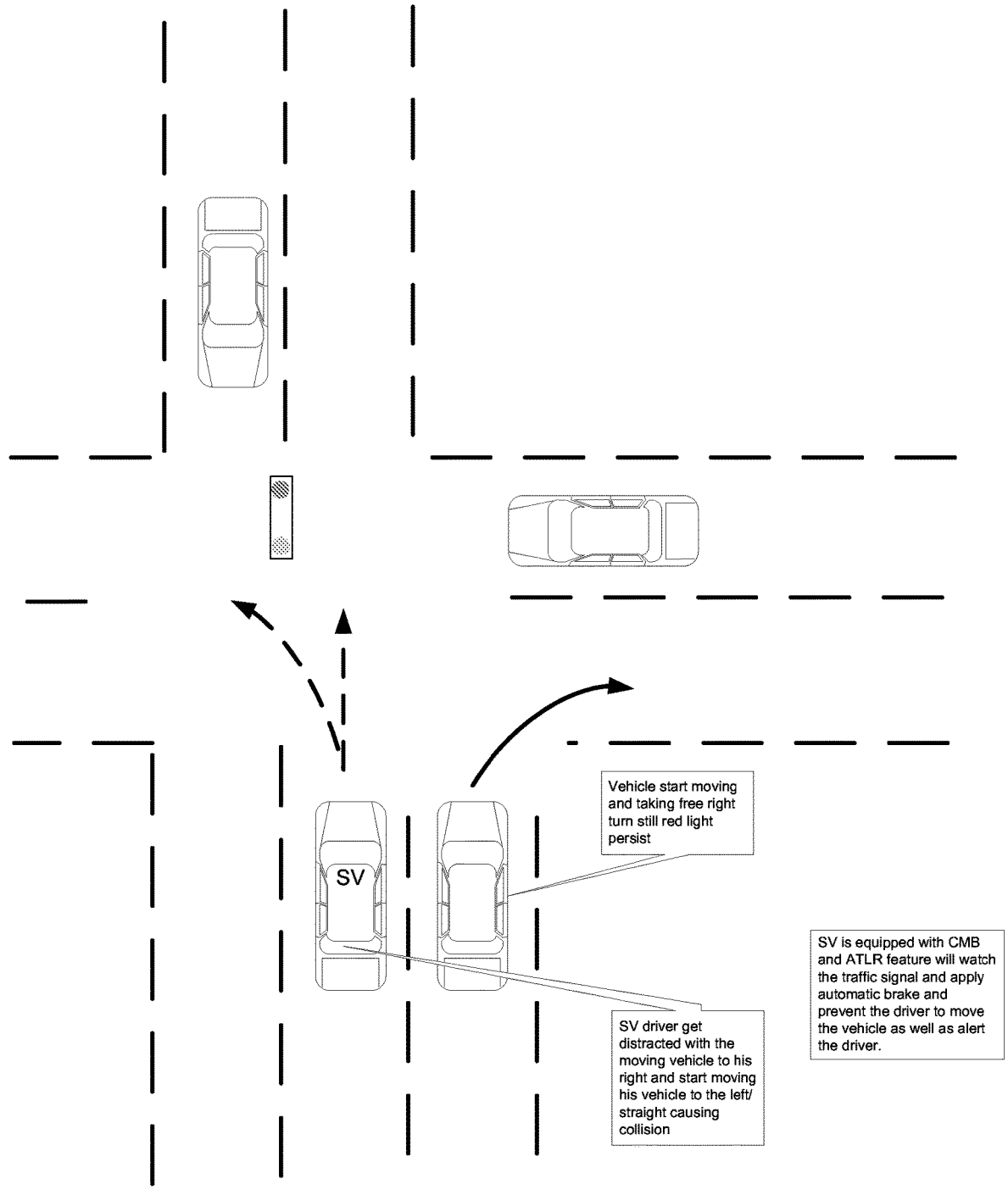
FIG. 3 is a schematic of a vehicle at an intersection and equipped with the adaptive traffic light response system of the present invention.

For example, and such as shown in FIG. 3, when the subject vehicle (equipped with the adaptive traffic light response system of the present invention) approaches an intersection with a red light and a vehicle in the right lane starts to make a right turn on red, the driver of the subject vehicle may be distracted by the moving vehicle at the right of the subject vehicle and may start moving the subject vehicle forward (incorrectly assuming that the traffic light has changed to green). The subject vehicle may be equipped with a collision mitigation braking system and the adaptive traffic light response system monitors the traffic light status and may (responsive to a determination that the traffic light is red) generate an alert to the driver and/or may automatically apply the brakes of the subject vehicle to prevent the driver from moving the vehicle forwardly into the intersection until the traffic light changes to green. The control may determine that the traffic light status is red via image processing and/or a V2I communication (which may also indicate if a green right turn arrow was also activated when the subject vehicle started moving forward).

Figure 4:
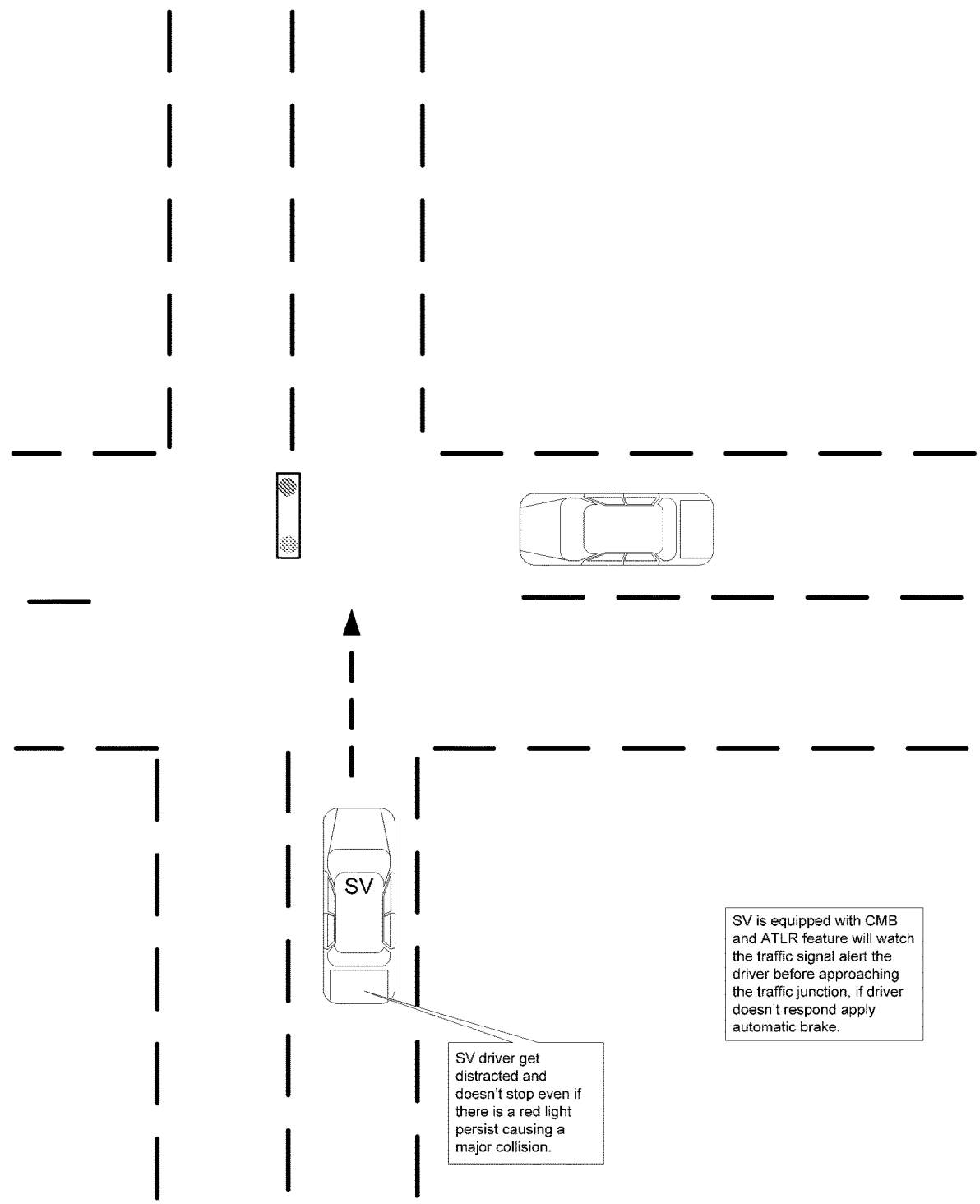
FIG. 4 is another schematic of a vehicle at an intersection and equipped with the adaptive traffic light response system of the present invention.

As shown in FIG. 4, when the subject vehicle approaches an intersection with a red light, the driver of the subject vehicle may be distracted and may not slow down or stop. The subject vehicle may be equipped with a collision mitigation braking system and the adaptive traffic light response system monitors the traffic light status and may (responsive to a determination that the traffic light is red) generate an alert to the driver before the vehicle approaches and enters the intersection. If the driver does not respond to the alert by applying the brakes, the system may automatically apply the brakes of the subject vehicle to prevent the driver from moving the vehicle forwardly into the intersection while the traffic light is determined to be red.

Thus, the subject or host vehicle is equipped with a front imager of forward viewing camera and an image processing algorithm that processes captured image data and determines the traffic light status. The ATLR algorithm running in the ECU will monitor the vehicle status and the driver response and alert the driver if he/she is making a mistake, and if the TTC exceeds a threshold level, the system will apply brake to limit or prevent or mitigate the collision. Optionally, if traffic lights are equipped with a V2I communication module, then the traffic light will broadcast the present status of the traffic light. This information may be received by the V2I communication module of the vehicle, and this information may be used to fuse with the camera captured image data to achieve higher reliability in poor visibility or poor weather conditions. When the vehicle is equipped with GPS data map, the ATLR module may use the traffic light location information to fuse with the camera traffic light information to achieve enhanced system performance. The present invention thus provides a system that may enhance an existing CMB system or feature and/or may be used in an autonomous vehicle.

Optionally, the vehicle may include a cooperative v2v-based (vehicle-to-vehicle-based) parking solution or system. Often, a driver of a vehicle, when trying to find a parking slot, may have difficulties with large parking lots as the user may need to keep driving in many rows to find a free parking slot. For example, and with reference to FIG. 5, the subject vehicle and other vehicles at a parking lot may be equipped with a v2v communication link. When the driver of the subject vehicle is looking for an open parking slot, the subject vehicle will receive the information of all the available free slots at that parking lot via the v2v communication link.

Upon receipt of a communication (such as via a Designated Short Range Communication (DSRC) radio or v2v communication or the like) indicative of an available empty parking slot, the driver of the vehicle will select the nearest open slot and reserve the slot, with the reservation protocol preferably being cooperatively accomplished. For example, if there are multiple users that want to reserve an open slot at a same time, then no one will get the open slot reserved. The users may continue to transmit the reserve request after a random time interval and one of the users may eventually reserve the open slot. If no other users are looking to reserve the slot, then the user who first reserves the slot will get the slot reserved and may broadcast or transmit a communication indicative of the slot being reserved.

Figure 5:
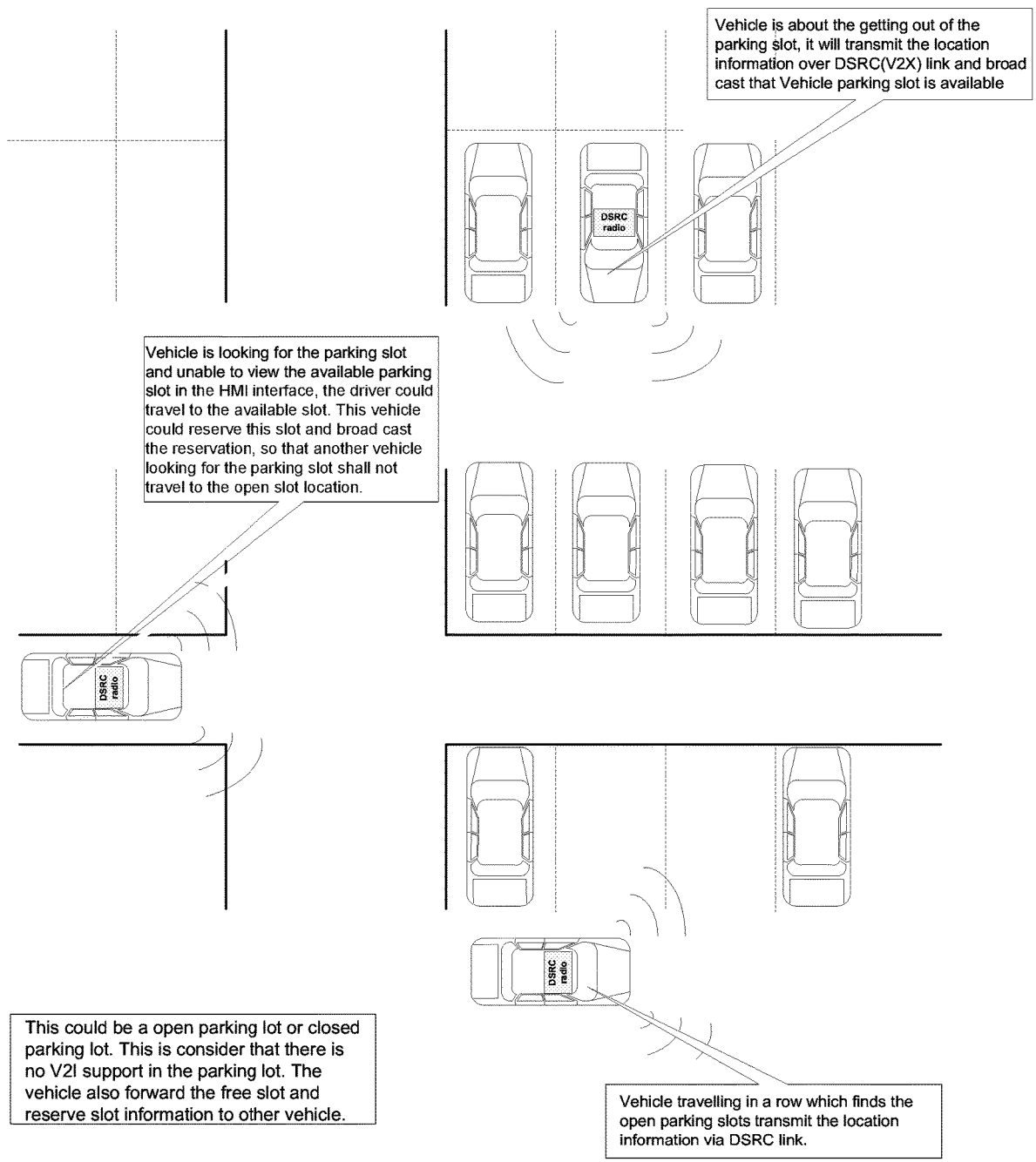
FIG. 5 is a schematic of use of a parking slot finding system in accordance with the present invention.

The determination of an open slot may be made via another vehicle leaving a parking slot (and transmitting the location information at that time) or via parked vehicles communicating information about an open parking slot at or near the parked vehicle or via a communication from another vehicle moving through the parking lot and determining one or more empty slots as it moves through the parking lot. For example, and as shown in FIG. 5, when a previously parked vehicle is starting to leave its parking slot, that vehicle's communication system (such as via a DSRC radio or v2x (vehicle-to-infrastructure) link or the like) will start transmitting the location information about the parking slot that is being vacated and that is going to be open or available. Also, such as also shown in FIG. 5, other vehicles that are looking for an open parking slot may determine open slots and may broadcast or transmit a communication regarding open slot information when the vehicle's system finds another open slot (such as by using a camera or vision system or an ultrasonic sensor system or the like) as that vehicle is driving through the parking lot. The vehicles looking for a parking slot, responsive to the communications regarding available slots, may also be able to reserve a slot that is open or available. All the vehicles equipped with the communication link and system of the present invention may forward a list of open slots as well as reserved slots to provide a further range for the communications so as to reach vehicles just entering the parking lot or the like that may be a substantial distance from an available slot.

The parking slot determining and reserving system of the present invention may provide enhanced determination and reservation of parking slots for vehicles equipped with a communication link or the like (such as a v2v communication link or v2x communication link or the like). The present invention provides enhanced parking coordination and may provide an automated and coordinated parking solution.

Figure 6:
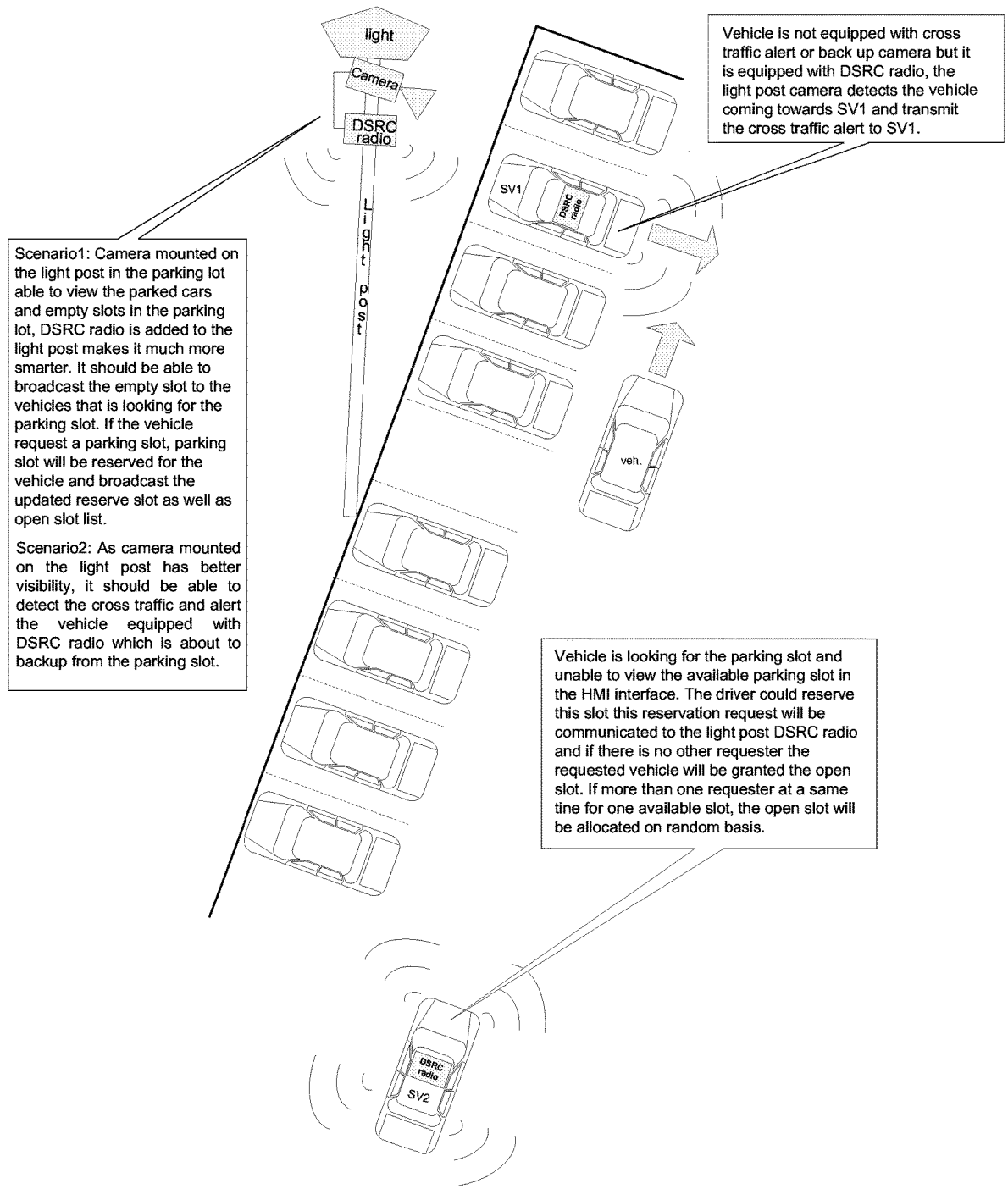
FIG. 6 is a schematic of use of another parking slot finding system in accordance with the present invention.

Optionally, the parking lot may also provide communications regarding parking slot availability. For example, and with reference to FIG. 6, many light posts in a parking lot are equipped with a camera that has better visibility of the open slots as well as traffic moving towards filled slots where the parked vehicle is leaving or backing up from the slot. If the light posts were provided with a DSRC radio and the camera output were fed to the DSRC radio, the radio could then transmit or communicate or broadcast parking slot information, which may achieve a smart parking solution. The DSRC radio located in the light post may process the camera or video image data and may identify an open parking slot and generate a communication regarding the parking slot availability and/or update an existing list of available parking slots and may broad cast or transmit that communication to the vehicles at the parking lot that are looking for an empty and available parking slot.

When the driver of a DSRC equipped vehicle is looking for an open slot, the open slot list transmitted by the light post DSRC radio appears at the human machine interface or HMI (such as at a display screen or the like in the cabin of the equipped vehicle and viewable by the driver) and the driver may reserve an open slot using the HMI. This reservation request is transmitted to the light post DSRC radio (or a centralized processor that is linked to multiple parking lot system DSRC radios at light posts or other structures at the parking lot), and if the system has not received any other vehicle request for the same slot, the system reserves the slot and transmits the updated open slot and reserved slot list and confirms the reservation request. Once the reservation is complete, the vehicle driver that was looking for the open slot and selected the slot may park his or her vehicle at the reserved slot. Optionally, because the GPS location of the light post DSRC radio may be programmed at the installation time, the location of the open slot with respect to the light post location could be calculated in the light post DSRC radio and transmitted along with the open slot/reserve slot list.

The system may continuously update the parking slot availability list over time. For example, when a vehicle moves out of a parking slot, the DSRC radio at the parking lot detects this via image processing of captured image data and updates the open slot list accordingly. Optionally, the parking lot DSRC radio system may also be used as a cross traffic alert device for vehicles that are equipped with DSRC radios or communication links or the like with no cross traffic detection. For example, the system may detect two vehicles approaching an intersection of the parking lot or may detect a leaving vehicle backing or driving into a path of travel of another vehicle, and may generate an alert to the drivers of those vehicles to warn them of a potential collision. The communication systems and parking slot finding assist system may utilize aspects of the systems described in U.S. patent application Ser. No. 14/303,695, filed Jun. 13, 2014 and published Dec. 25, 2014 as U.S. Publication No. US-2014-0375476, which is hereby incorporated herein by reference in its entirety.

Optionally, the vehicle may include a cooperative lane sharing system that assists the driver in determining when a vehicle (such as a motorcycle or the like) is approaching from behind the equipped vehicle and in the same lane as the equipped vehicle but at a side of the lane so as to "share" the lane as traffic moves along the road. In many countries, such lane sharing is legal to improve the efficiency of the roadway, whereby vehicles or cars and motor cycles share the same lane (in a side-by-side manner) especially during the traffic jam condition. At present, the vehicle driver looks for a motor cycle approaching (such as at the left side of the vehicle) and makes the pathway available by manually driving closer to the right side of the lane. This coordination is sometimes difficult, because the driver of the subject vehicle may not be able to see the approaching motorcycle and may want to change lanes in front of the approaching motorcycle, which may result in a collision.

Figure 7:
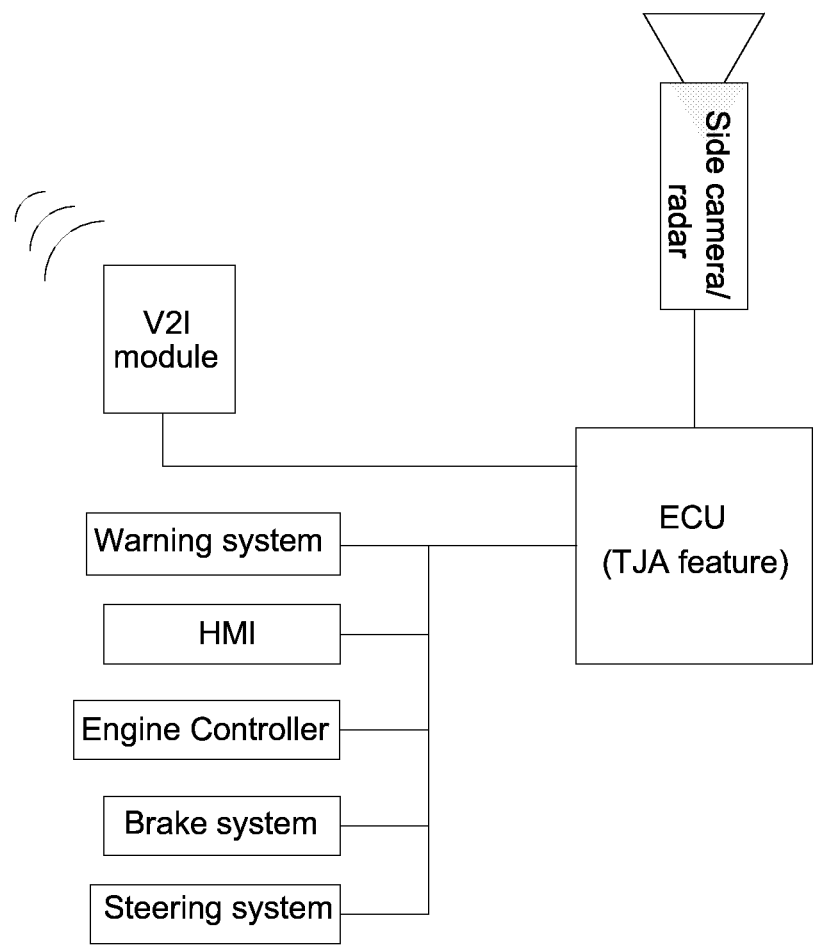
FIG. 7 is a schematic of a vehicle vision and communication system in accordance with the present invention.
Figure 8:
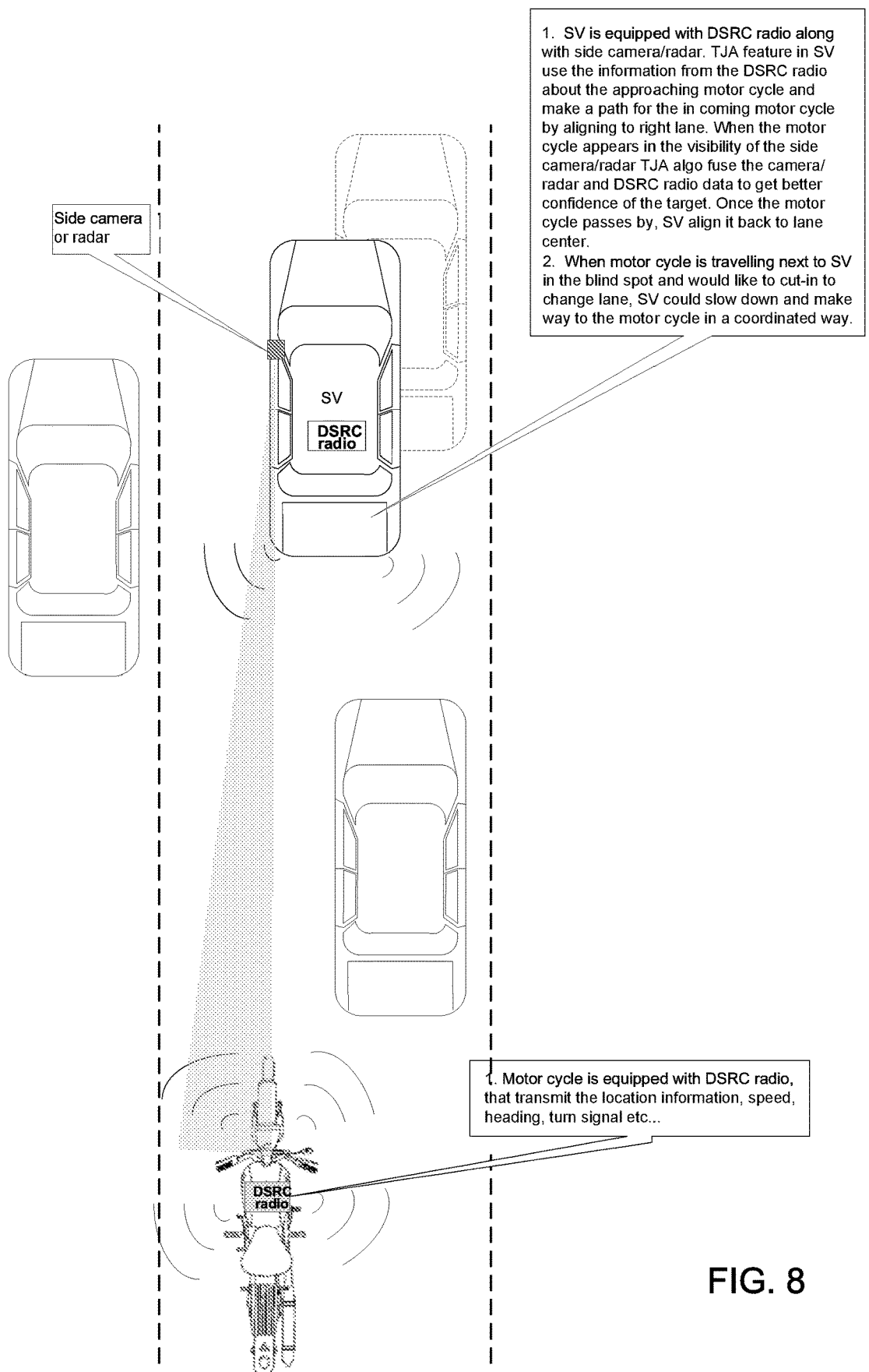
FIG. 8 is a schematic of use of the vehicle vision and communication system of FIG. 7.

As shown in FIGS. 7 and 8, the subject may be equipped with a DSRC radio along with a side camera or radar sensor or the like. A traffic jam assist (TJA) feature of the subject vehicle may use the information from the DSRC radio about an approaching motorcycle and the vehicle system may automatically make a path for the approaching motorcycle by aligning the vehicle to the right lane making (virtual splitting/sharing the lane). When the motorcycle appears in the visibility of the side camera/radar, the TJA algorithm may fuse the camera/radar and DSRC radio data to get better confidence of the target (approaching motor cycle). Once the motor cycle passes by, the vehicle system may align the vehicle back to the lane center.

When the motorcycle is travelling next to the subject vehicle in the blind spot and would like to cut-in to change lane, the subject vehicle system may determine such a maneuver (such as responsive to detecting a turn signal activation of the motorcycle or the like) and may slow down the subject vehicle and make way for the motor cycle lane change in a coordinated manner. Optionally, the motorcycle may also receive information or data from the vehicle and that information may alert the driver of the motorcycle if the car/vehicle ahead of the motorcycle is about to make a lane change, whereby the motorcycle driver can be prepared to stop of slow down. The TJA system and lane sharing system of the present invention may utilize aspects of the systems described in U.S. patent application Ser. No. 14/303,694, filed Jun. 13, 2014, now U.S. Pat. No. 9,260,095, which is hereby incorporated herein by reference in its entirety.

Optionally, a system of the present invention may function to enhance turning by vehicles through intersections, such as when the driver of a vehicle is making a left turn through an intersection. For example, in Canada it is common to have intersections with no left signal lights even with large roads with multiple lanes. The vehicles that need to make a left turn have to take a turn in a coordinated manner, and this may lead to accidents as the driver of the subject vehicle may not be able to see an approaching vehicle in another lane (because the driver's view may be blocked by another stopped vehicle in front of the subject vehicle and trying to make a left turn in the other direction) or often the driver may make mistakenly judge the speed of an approaching vehicle and try to make a left turn which may result in an accident.

Figure 9:
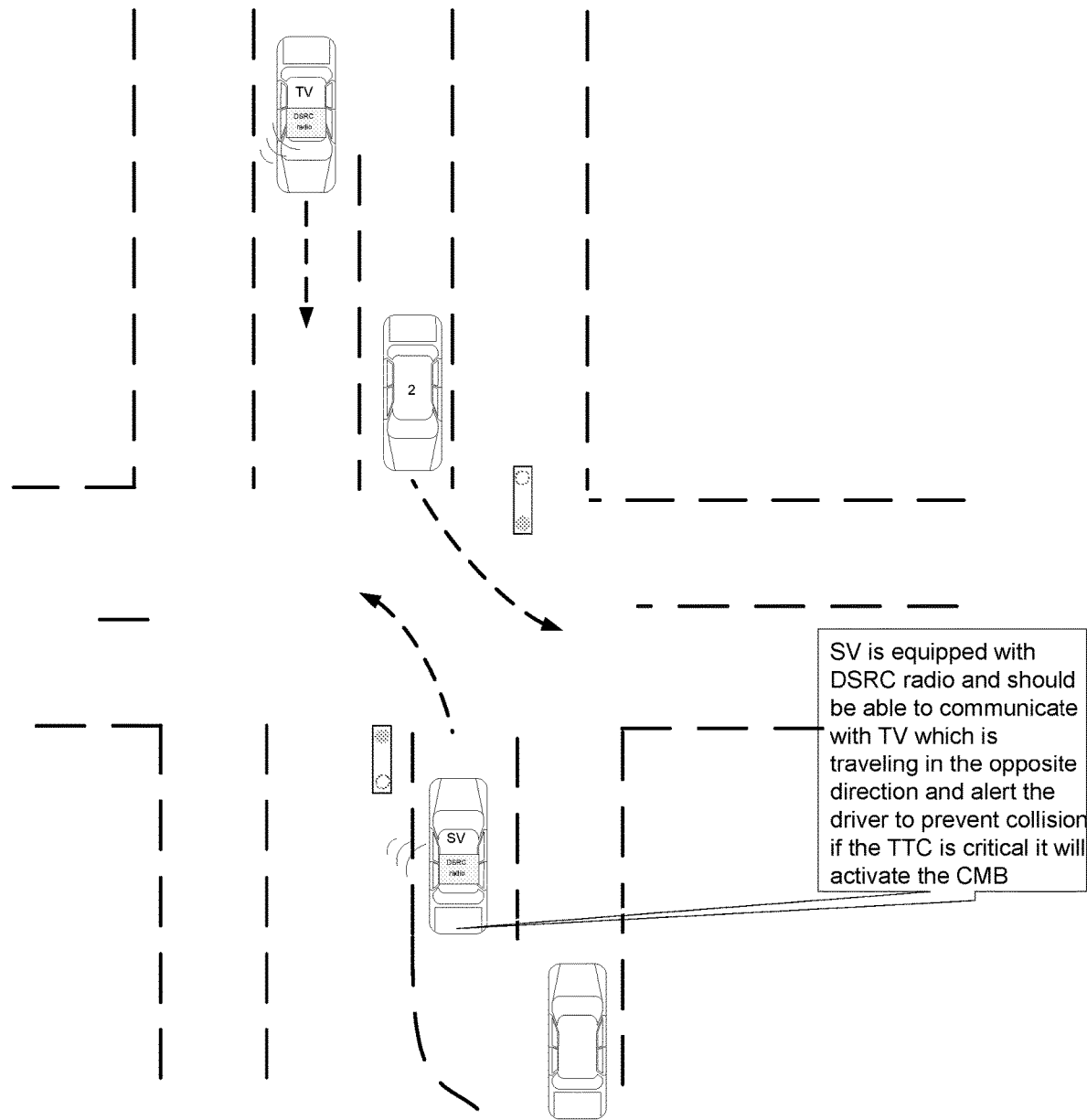
FIG. 9 is a schematic of a vehicle at an intersection and equipped with a communication system of the present invention.

This is a very common scenario for example, in Canada, even with multiple lanes. For example, and such as shown in FIG. 9, the subject vehicle (SV) driver's view is blocked by a stopped vehicle (2), which is trying to turn left at the intersection. The SV driver needs to coordinate with the target vehicle (TV), which is approaching the intersection (possibly at high speed) and the SV driver needs to make a judgment to turn left, which may lead to an accident if the driver of the SV is not able to make the right decision at the right time. The system of the present invention may help the SV driver to make the right decision as well as automatically apply braking in the event of a dangerous situation (such as if the SV driver makes a poor decision to turn in front of a fast approaching target vehicle) to prevent accident.

Figure 10:
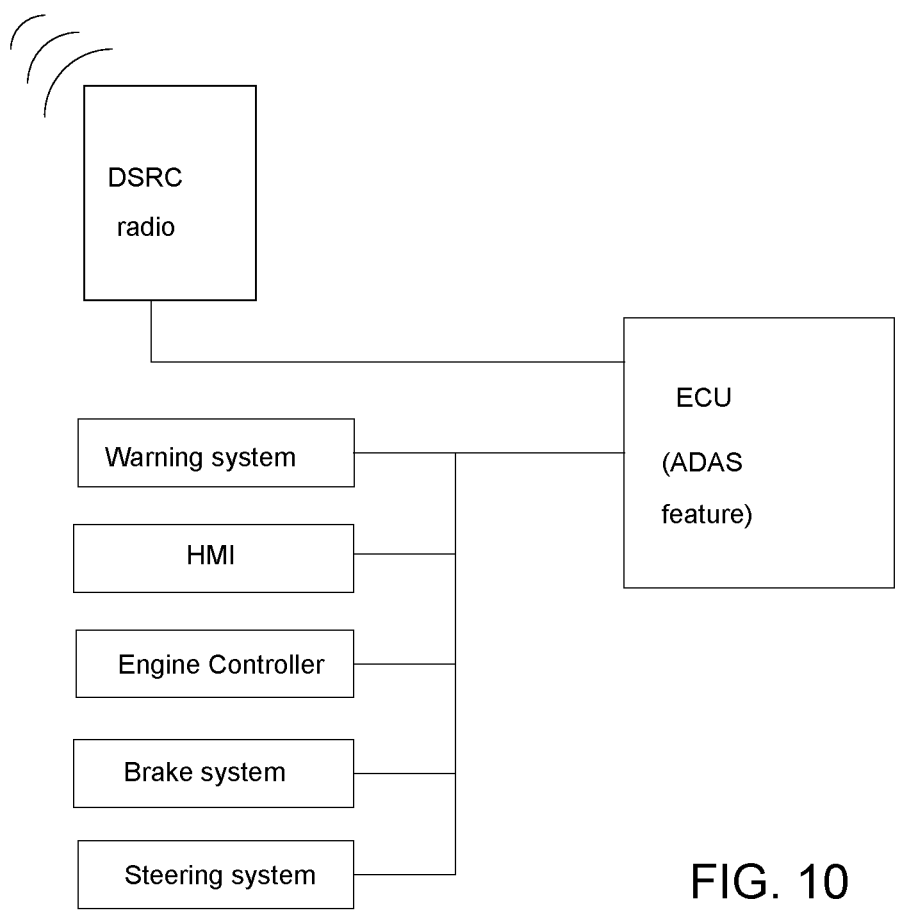
FIG. 10 is a schematic of the communication system of the vehicle of FIG. 9.

In accordance with the present invention, and such as shown in FIGS. 9 and 10, the SV and TV are equipped with a DSRC radio, and the SV should be able to receive the speed, acceleration, relative distance of the TV approaching the intersection. Using this information, the ADAS system of the present invention computes the Time To Collision (TTC) and alerts the SV driver even if the driver is not able to see the approaching vehicle (TV) ahead of and approaching the SV. If the determined or computed TTC exceeds a certain threshold, the ADAS system may activate automatic braking of the SV to limit movement of the SV into the path of the TV and thus to limit or substantially preclude a collision with the TV.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2™ or EYEQ3™ image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/ or WO 2013/016409, and/or U.S. Pat. Publication No. US 2010-0020170, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542, 451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760, 962; 5,715,093; 5,877,897; 6,922,292; 6,757,109; 6,717, 610; 6,590,719; 6,201,642; 6,498,620; 5,796,094; 6,097, 023; 6,320,176; 6,559,435; 6,831,261; 6,806,452; 6,396, 397; 6,822,563; 6,946,978; 7,339,149; 7,038,577; 7,004, 606; 7,720,580 and/or 7,965,336, and/or International Publication Nos. WO 2009/036176 and/or WO 2009/ 046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S.

patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular parking system, the vehicular parking system comprising:
   a vehicle-to-vehicle (V2V) communication system disposed at a first vehicle;
   wherein, as the first vehicle navigates a parking facility in search of an available parking space, the V2V communication system at the first vehicle receives a parking space availability communication from a second vehicle;
   wherein the second vehicle is also navigating the parking facility, and wherein the parking space availability communication indicates multiple available parking spaces within the parking facility, and wherein the multiple available parking spaces are determined by the second vehicle as the second vehicle navigates the parking facility and passes available parking spaces, and wherein the second vehicle determines the multiple available parking spaces responsive to processing of image data captured by a camera disposed at the second vehicle;
   wherein the vehicular parking system, responsive to the V2V communication system at the first vehicle receiving the parking space availability communication, reserves one of the multiple available parking spaces of the parking space availability communication for the first vehicle; and
   wherein the vehicular parking system communicates, using the V2V communication system, the reservation of the one of the multiple available parking spaces of the parking space availability communication to a third vehicle.

2. The vehicular parking system of claim 1, wherein the vehicular parking system, responsive to receiving the parking space availability communication, forwards the parking space availability communication to a fourth vehicle that is different than the second vehicle and the third vehicle.

3. The vehicular parking system of claim 1, wherein the V2V communication system comprises a designated short range communication (DSRC) radio.

4. The vehicular parking system of claim 1, wherein the vehicular parking system reserves the one of the multiple available parking spaces of the parking space availability communication responsive to selection of the one of the multiple available parking spaces of the parking space availability communication by a driver of the first vehicle.

5. The vehicular parking system of claim 1, wherein the vehicular parking system communicates the reservation of the one of the multiple available parking spaces of the parking space availability communication to a fourth third vehicle that is different than the second vehicle and the third vehicle.

6. The vehicular parking system of claim 1, wherein the vehicular parking system, when reserving the one of the multiple available parking spaces of the parking space availability communication, continuously transmits a reserve request after a random time interval until the one of the multiple available parking spaces of the parking space availability communication is reserved.

7. The vehicular parking system of claim 1, wherein the second vehicle determines the multiple available parking spaces responsive to processing of sensor data captured by an ultrasonic sensor disposed at the second vehicle.

8. The vehicular parking system of claim 1, wherein the parking space availability communication comprises a location of each available parking space of the multiple available parking spaces of the parking space availability communication.

9. A vehicular parking system, the vehicular parking system comprising:
   a vehicle-to-vehicle (V2V) communication system disposed at a first vehicle;
   wherein, as the first vehicle navigates a parking facility in search of an available parking space, the V2V communication system at the first vehicle receives a parking space availability communication from a second vehicle;
   wherein the second vehicle is also navigating the parking facility, and wherein the parking space availability communication indicates multiple available parking spaces within the parking facility, and wherein the multiple available parking spaces are determined by the second vehicle as the second vehicle navigates the parking facility and passes available parking spaces, and wherein the second vehicle determines the multiple available parking spaces responsive to processing of image data captured by a camera disposed at the second vehicle;
   wherein the vehicular parking system, responsive to the V2V communication system at the first vehicle receiving the parking space availability communication, reserves one of the multiple available parking spaces of the parking space availability communication for the first vehicle;
   wherein the vehicular parking system, responsive to receiving the parking space availability communication, using the V2V communication system, forwards the parking space availability communication to a third vehicle that is different than the second vehicle; and
   wherein the vehicular parking system, using the V2V communication system, communicates the reservation of the one of the multiple available parking spaces of the parking space availability communication to the third vehicle.

10. The vehicular parking system of claim 9, wherein the V2V communication system comprises a designated short range communication (DSRC) radio.

11. The vehicular parking system of claim 9, wherein the vehicular parking system reserves the one of the multiple available parking spaces of the parking space availability communication responsive to selection of the one of the multiple available parking spaces of the parking space availability communication by a driver of the first vehicle.

12. The vehicular parking system of claim 9, wherein the vehicular parking system, when reserving the one of the multiple available parking spaces of the parking space availability communication, continuously transmits a reserve request after a random time interval until the one of the multiple available parking spaces of the parking space availability communication is reserved.

13. The vehicular parking system of claim 9, wherein the second vehicle determines the multiple available parking spaces responsive to processing of sensor data captured by an ultrasonic sensor disposed at the second vehicle.

14. A vehicular parking system, the vehicular parking system comprising:
   a vehicle-to-vehicle (V2V) communication system disposed at a first vehicle;
   wherein, as the first vehicle navigates a parking facility in search of an available parking space, the V2V communication system at the first vehicle receives a parking space availability communication from a second vehicle;
   wherein the second vehicle is also navigating the parking facility, and wherein the parking space availability communication indicates multiple available parking spaces within the parking facility, and wherein the parking space availability communication comprises a location of each available parking space of the multiple available parking spaces of the parking space availability communication, and wherein the multiple available parking spaces are determined by the second vehicle as the second vehicle navigates the parking facility and passes available parking spaces, and wherein the second vehicle determines the multiple available parking spaces responsive to processing of (i) image data captured by a camera disposed at the second vehicle or (ii) sensor data captured by an ultrasonic sensor disposed at the second vehicle;
   wherein the vehicular parking system, responsive to the V2V communication system at the first vehicle receiving the parking space availability communication, reserves one of the multiple available parking spaces of the parking space availability communication for the first vehicle;
   wherein the vehicular parking system communicates, using the V2V communication system, the reservation of the one of the multiple available parking spaces of the parking space availability communication to a third vehicle.

15. The vehicular parking system of claim 14, wherein the vehicular parking system, responsive to receiving the parking space availability communication, forwards the parking space availability communication to a fourth vehicle that is different than the second vehicle and the third vehicle.

16. The vehicular parking system of claim 14, wherein the V2V communication system comprises a designated short range communication (DSRC) radio.

17. The vehicular parking system of claim 14, wherein the vehicular parking system reserves the one of the multiple available parking spaces of the parking space availability communication responsive to selection of the one of the multiple available parking spaces of the parking space availability communication by a driver of the first vehicle.

\* \* \* \* \*

UNITED STATES PATENT AND TRADEMARK OFFICE
CERTIFICATE OF CORRECTION

PATENT NO. : 12,211,289 B2  
APPLICATION NO. : 18/065746  
DATED : January 28, 2025  
INVENTOR(S) : Krishna Koravadi Page 1 of 1

It is certified that error appears in the above-identified patent and that said Letters Patent is hereby corrected as shown below:

In the Claims

<u>Column 13</u>  
Lines 18-19, Claim 5, "fourth third vehicle" should be --fourth vehicle--

<u>Column 14</u>  
Line 57, Claim 14, "first vehicle;" should be --first vehicle; and--

Signed and Sealed this  
Twenty-fifth Day of February, 2025

Coke Morgan Stewart  
*Acting Director of the United States Patent and Trademark Office*